May 25, 1926.

E. M. POWELL

STORAGE BATTERY TERMINAL

Filed August 22, 1922

1,585,874

Inventor:
Earl M. Powell
by Byrnes, Townsend & Brickenstein,
Attorneys.

Patented May 25, 1926.

1,585,874

UNITED STATES PATENT OFFICE.

EARL M. POWELL, OF CLERMONT, INDIANA, ASSIGNOR, BY MESNE ASSIGNMENTS, TO THE PREST-O-LITE COMPANY, INC., OF INDIANAPOLIS, INDIANA, A CORPORATION OF NEW YORK.

STORAGE-BATTERY TERMINAL.

Application filed August 22, 1922. Serial No. 583,596.

This invention relates to an improved storage battery terminal.

In storage batteries, especially those of the lead-acid type, the electrodes and electrolyte are enclosed in a container of non-conducting acid-resistant material, such as hard rubber, the terminals of the enclosed electrodes protruding as posts through openings in the cover.

Such metal terminal posts have heretofore been threaded to receive nuts adapted to clamp the posts, in acid-tight position in the cover openings, with gaskets interposed between the post and cover, if desired. The efficiency of the liquid-tight joint produced by such clamping action depends upon the pressure exerted by the cooperation of the threaded nut and threaded post. Accordingly, the nut is screwed down onto the post as tightly as possible, usually causing the nut to "freeze" to the post. The post and nut are of acid-resistant or non-corrodible conducting material, such as lead or lead-antimony members of this nature usually unite or adhere at a temperature much below the melting point of the material, when sufficient pressure is exerted thereon and unless some substance that prevents such union is present. It is often very difficult to separate a nut of the ordinary type from a threaded terminal post to which it is frozen, and in many instances the threads of the nut or those on the post or both are stripped, making it impossible to replace the same nut or even a new one, when the threads on the post are mutilated.

The object of the present invention is to provide a threaded clamping nut that will overcome this objection. The improved nut is broadly similar to the usual nut, except that it has a split or slot through its wall at one point so that if it freezes to the terminal post the union between the nut and the post may be gradually broken, first adjacent and at one side of the split and then progressively around the post to the other side of the split. Furthermore, even if the nut does not yield to an unscrewing operation, it may be stripped off without damaging the threads on the post, and a similar new nut may be replaced without requiring a rethreading of the post.

The above and other objects and the novel features of this invention will be apparent from the following description taken with the accompanying drawings in which—

Figure 1:
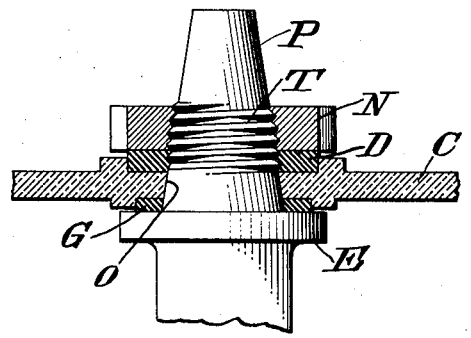
Fig. 1 is a view of part of a storage battery cover and terminal post assembly embodying this invention.
Figure 2:
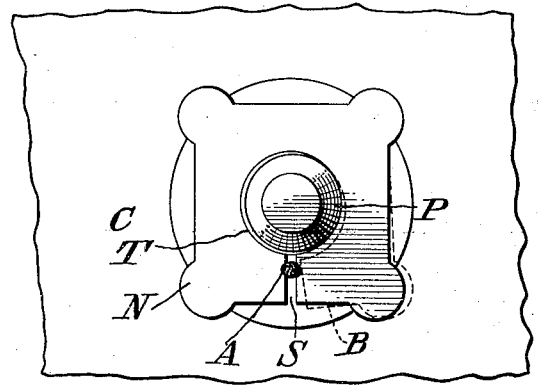
Fig. 2 is a plan view of the same.

Referring to the drawings a storage battery cell cover of hard rubber or other suitable material is indicated at C and is provided with an opening O through which a plate terminal post P projects. The terminal post P may be of a tapering shape and has the usual plate connector E at its base to which the storage battery plates (not shown) are connected or burned. The plate connector E provides a shoulder adapted to bear against the inside of the cover C. A gasket G of soft rubber or other suitable material may, if desired, be inserted between the shoulder E and the inside of the cover and around the post to provide a better seal at this point.

A part of the post P that projects through the opening O may be provided with threads T, as indicated, to receive an improved nut N embodying the present invention, by means of which the post P is retained in the opening O with the shoulder E pressing firmly against the inside of the cover. A gasket D of soft rubber or other suitable material may be interposed between the nut N and the upper side of the cover and around the post P to provide a better seal at the upper end of the opening O when the nut is tightly screwed down onto the post.

Figure 3:
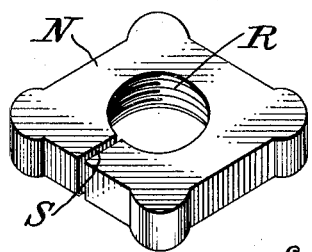
Fig. 3 is a perspective view of an improved nut embodying this invention.

As is best shown in Fig. 3, the nut N has threads R which correspond to the threads T on the terminal post. Furthermore, the nut is discontinuous, in other words it is split at a point S, such split or slot being formed by sawing out a narrow section transversely through the wall of the nut or otherwise. In the drawings the split is shown as extending radially through the wall of the nut but it may of course extend angularly or otherwise without sacrificing the advantages of the invention.

The terminal post P and the nut N may be of acid-resistant or non-corrodible material such as lead or antimony lead alloy. When the nut N has been screwed tightly down onto the post to assemble the parts and produce an acid-tight joint between the post and the cover, the gap at the split S may be bridged and the opposed ends of the split united locally by a drop of hot lead, as indicated at A, or by burning the opposed ends together at one point by a burning torch so as to prevent accidental spreading of these ends and loosening of the nut and assembly when the battery is in service.

It is likely that the excessive pressure between the nut and post will cause these parts to freeze together. The removal of the ordinary type of nut from the post for repairing or examining the assembly is rendered very difficult and may result in stripping the threads of the nut or post or both, as explained. In removing the split nut N of the present invention, if the opposed ends at the split have been united, it is merely necessary to cut through the union or drop of lead with a suitable tool and then the nut may usually be turned off with a suitable wrench. As the nut is unscrewed, the removing pressure applied by the wrench will be concentrated at the right side of the split at the union between the nut and the post, causing the nut to first break away at this point. The split construction of the nut then permits this portion or end of the nut to gradually spread away from the post, as indicated by the dotted lines at B, and the rupturing of the union between the nut and the post advances gradually in this manner around the post to the other side of the split, releasing the frozen parts so that the nut may readily be unscrewed from the post. Usually only a comparatively slight force is required to unscrew the nut because the rupturing or separation of the nut from the post advances from point to point around the circumference of the post and the force applied by the wrench is successively concentrated at such points of rupturing. Should it be impossible to unscrew the nut in this manner, it is still possible to strip or tear off the nut which, if destroyed, may be replaced by a similar new nut. The mutilation of the threads of the post and distortion of the latter are thus avoided.

The pitch of the cooperating threads may conform to the usual practice or may vary therefrom as desired. The periphery of the nut may be of any desired shape that is adapted to take a wrench. A special type of nut, as illustrated, may be employed which is adapted to take a special wrench constructed to be applied to the nut only in a certain position, and the wrench or the nut or both may also be marked so as to indicate the proper position for applying the wrench. It is desirable that the wrench be so applied on tightening that there will be a minimum tendency for the nut to open at the split section, and on loosening, the wrench should be so adjusted and positioned that it will exert the greatest tendency to widen the gap made in the nut by the cut-out section. The wrench occupies this position when the heel thereof is placed so that it may engage that part of the nut as near the advancing side of the gap as possible when the nut is turned.

While the improved nut and its application to a storage battery cover and post assembly are described in detail it will be understood that various changes may be made in such application without departing from the spirit of the invention.

I claim:—

1. In a storage battery, in combination, a cover having an opening therethrough, a threaded terminal post projecting through said opening, and a threaded split nut screwed onto said post and retaining the same in said opening.

2. In a storage battery, in combination, a cover having an opening therethrough, a threaded terminal post projecting through said opening, a threaded nut screwed onto said post to retain it in said opening, said nut being split at one point thereby providing slightly separated ends, and means uniting said ends to prevent accidental spreading thereof.

3. A nut for use with a cover and post assembly of a storage battery, such nut comprising acid-resistant material such as lead or antimony-lead alloy and having a split extending through the wall thereof providing opposed separable portions.

4. A nut for use with a cover and post assembly of a storage battery and liable to adhere to the post, such nut having a split extending through the wall thereof providing separable portions, and constructed and arranged to take a wrench in a predetermined position to move one of such portions relatively to the other in removing said nut from the assembly.

5. A nut for use with a cover and post assembly of a storage battery, such nut having a split extending through the wall thereof providing separable portions, and projections at predetermined points on the periphery of said nut arranged to be engaged by a wrench to move one of such portions relatively to the other in removing said nut from the assembly.

In testimony whereof, I affix my signature.

EARL M. POWELL.